(12) United States Patent
Engelhardt

(10) Patent No.: US 10,176,806 B2
(45) Date of Patent: Jan. 8, 2019

(54) MOTOR VEHICLE OPERATING DEVICE WITH A CORRECTION STRATEGY FOR VOICE RECOGNITION

(71) Applicant: AUDI AG, Ingolstadt (DE)

(72) Inventor: Doreen Engelhardt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 14 days.

(21) Appl. No.: 15/503,053

(22) PCT Filed: Oct. 22, 2015

(86) PCT No.: PCT/EP2015/002098
§ 371 (c)(1),
(2) Date: Feb. 10, 2017

(87) PCT Pub. No.: WO2016/082904
PCT Pub. Date: Jun. 2, 2016

(65) Prior Publication Data
US 2017/0229120 A1    Aug. 10, 2017

(30) Foreign Application Priority Data

Nov. 24, 2014   (DE) .................. 10 2014 017 384

(51) Int. Cl.
*G10L 15/22*    (2006.01)
*G06F 3/0482*   (2013.01)
(Continued)

(52) U.S. Cl.
CPC .............. *G10L 15/22* (2013.01); *G06F 3/013* (2013.01); *G06F 3/0482* (2013.01);
(Continued)

(58) Field of Classification Search
CPC ..... G10L 15/22; G10L 15/19; G10L 15/1807; G10L 2015/088; G10L 2015/223;
(Continued)

(56) References Cited

U.S. PATENT DOCUMENTS

| | | | |
|---|---|---|---|
| 5,855,000 A * | 12/1998 | Waibel | G06K 9/03 704/235 |
| 6,067,521 A * | 5/2000 | Ishii | G01C 21/3608 701/532 |

(Continued)

FOREIGN PATENT DOCUMENTS

EP     1215659 A1    6/2002

OTHER PUBLICATIONS

Translation of the International Preliminary Report on Patentability dated Jun. 8, 2017, in connection with corresponding international Application No. PCT/EP2015/002098 (10 pgs.).

(Continued)

*Primary Examiner* — Edwin S Leland, III
(74) *Attorney, Agent, or Firm* — Maier & Maier, PLLC

(57) ABSTRACT

The invention relates to a method for operating a motor vehicle, wherein a first speech input of a user is received, at least one recognition result (A-D) is determined by means of a speech recognition system, at least one recognition result (A-D) is output to an output device of the motor vehicle as a result list and a second speech output of the user is received. The objective of the invention is to avoid a double input of false recognition results. In the second speech input, first, a content input repetition of the first speech input is recognized, which points to a correction request of the user. As a result, an excludable portion of the result list is determined and with the determination of a recognition result (C-E) for the second speech input, the excludable portion is excluded as a possible recognition result.

8 Claims, 1 Drawing Sheet

(51) Int. Cl.
*G06F 3/01* (2006.01)
*G06F 3/0485* (2013.01)
*G10L 15/18* (2013.01)
*G10L 15/19* (2013.01)
*G10L 15/08* (2006.01)

(52) U.S. Cl.
CPC ........ *G06F 3/0485* (2013.01); *G10L 15/1807* (2013.01); *G10L 15/19* (2013.01); *G10L 2015/088* (2013.01); *G10L 2015/223* (2013.01); *G10L 2015/228* (2013.01)

(58) Field of Classification Search
CPC . G10L 2015/228; G06F 3/0482; G06F 3/013; G06F 3/0485
USPC .......................................................... 704/257
See application file for complete search history.

(56) References Cited

U.S. PATENT DOCUMENTS

| | | | | |
|---|---|---|---|---|
| 6,081,780 A * | 6/2000 | Lumelsky | ............... | G10L 13/08 704/260 |
| 6,111,964 A * | 8/2000 | Ishibashi | ............. | B60R 11/0247 379/454 |
| 6,246,672 B1 * | 6/2001 | Lumelsky | ............... | H04L 29/06 370/310 |
| 6,351,273 B1 * | 2/2002 | Lemelson | ............... | G06F 3/013 704/271 |
| 7,809,567 B2 | 10/2010 | Ju et al. | | |
| 9,890,576 B2 * | 2/2018 | Elie | .......................... | E05F 15/70 |
| 2003/0018474 A1 * | 1/2003 | Chavan | .................... | G10L 15/26 704/270 |
| 2003/0074119 A1 * | 4/2003 | Arlinsky | ................ | B60K 35/00 701/36 |
| 2003/0216912 A1 | 11/2003 | Chino | | |
| 2007/0033025 A1 | 2/2007 | Helbing et al. | | |
| 2007/0073540 A1 * | 3/2007 | Hirakawa | ............... | G10L 15/22 704/252 |
| 2008/0162137 A1 * | 7/2008 | Saitoh | ..................... | G10L 15/22 704/251 |
| 2012/0010887 A1 * | 1/2012 | Boregowda | ........... | G10L 15/063 704/250 |
| 2012/0104844 A1 * | 5/2012 | Koiso | .................... | G08G 1/094 307/9.1 |
| 2014/0309864 A1 * | 10/2014 | Ricci | ....................... | H04W 4/21 701/36 |
| 2015/0287406 A1 * | 10/2015 | Kristjansson | ........... | G10L 15/20 704/233 |
| 2017/0169821 A1 * | 6/2017 | Engelhardt | ............... | G10L 15/22 |
| 2017/0229120 A1 * | 8/2017 | Engelhardt | ............... | G10L 15/22 |
| 2018/0130475 A1 * | 5/2018 | Page | ....................... | G06F 21/32 |
| 2018/0226086 A1 * | 8/2018 | Huang | ................... | H04R 1/406 |

OTHER PUBLICATIONS

German Office Action dated Jun. 25, 2015 of corresponding application No. DE10 2014 017 384.4; 6 pgs.

International Search Report and Opinion dated Mar. 18, 2016 of corresponding application No. PCT/EP2015/002098; 19 pgs.

* cited by examiner

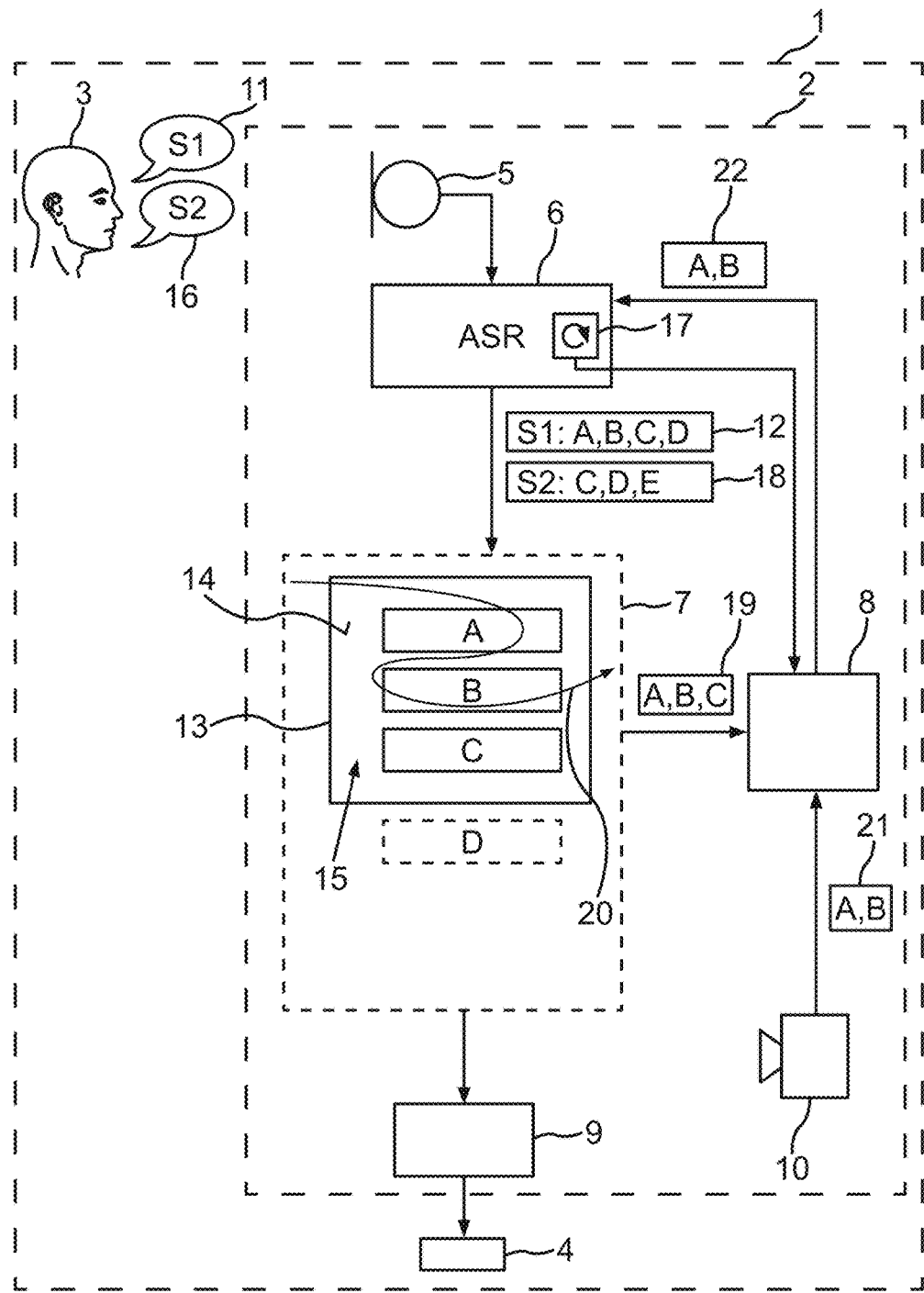

MOTOR VEHICLE OPERATING DEVICE WITH A CORRECTION STRATEGY FOR VOICE RECOGNITION

BACKGROUND

The invention relates to a method for operating a motor vehicle so as detect at least one recognition result with speech input of a user by means of a speech recognition system and to output this result in the form of a result list. If the user after that generates a second speech output, it is determined whether the user repeats or corrects the content of the first input when the desired recognition result is not found in the list of results. The invention also includes an operating device that is used to carry out the method, as well as a motor vehicle having the operating device.

The motor vehicle can be equipped with an operating device, or it can be coupled with a speech recognitions system and/or with a stationary speech recognition system via a radio connection. If a speech content is input by voice, the recognized recognition result is presented to the user in the form of speech and/or graphical feedback. If several recognition results are detected with the speech input, they can be presented as alternatives for a selection in a list of results.

If a user does not find the desired or intended recognition result, which is to say based on the speech content spoken by the user, he express as a rule again the speech content one more time. In this case, he can use the same formulation as with the first speech input, but also an alternative formulation. During the evaluation of this second speech input it is thus rarely not clear whether this is a correction, or a new speech content. Therefore, the second speech content is as a rule processed by means of the speech recognition system in the same manner as with the first input. In the list of the results detected in this manner thus may be contained also the recognition results and they may be unnecessarily presented one more time to the user. The results identified as incorrect in the first step by the user may therefore be recognized again after a new speech input and presented to the user.

From US 2007/0033025 A1 it is known that several resulting sentences can be detected with a sentence pronounced by a user. Subsequently, a test question is presented to the user to determine whether a certain word was contained in the sentenced expressed by him. If the user approves this, all records that do not contain the word are deleted. If the users answer to the question is negative, all the results that do contain the test result word are deleted.

From US 2003/0216912 A1 is known a speech recognition system wherein in the case when a user repeats the same sentence twice, matching portions and mutually different portions are detected in both recognition results. If a user particularly emphasizes a certain word with the second utterance of the sentence, it is assumed that this word was falsely recognized in the first recognition result. A recognition results is detected from the matching portions again and a recognition result is then again formed for the deviating portions.

From EP 1 215 659 A1 it is known that a first recognition result is recognized with a speech input of a user and the user is then asked whether this result is correct. If the denies this, the same speech input is processed one more time with changed parameters of the speech recognition system.

SUMMARY OF THE DISCLOSURE

The object of the invention is to avoid repeated generation of a false recognition result.

This object is achieved based on the subject matter of the independent patent claims. Preferred embodiments of the invention are obtained based on the features of the dependent patent claims.

In accordance with the invention, a method for operating a motor vehicle with an operating device is provided. A first speech input of the user is obtained according to the already described manner. The first speech input contains a speech content, for example a sentence or a word. At least one recognition result of the first speech input is determined by means of a speech recognition system, which can be provided internally in the vehicle (onboard), or externally, outside of the vehicle. Each recognition result may therefore include a recognized sentence or a recognized word. Several alternative recognition results can be produced from this, for example one N-best list (N best recognition result) that is per se known.

This at least one recognition result is output as a result list to an output device of the vehicle. A verbal or graphic feedback can be output to the user with the output device, in particular as the result list. The method is based on the fact that it is assumed that a second speech input of the user will be received after that.

The method according to the invention is characterized in that in the second speech input is a recognized input repetition of the content of the first speech input. It should be emphasized that a content repetition is recognized. This can occur based on a literal repetition of the first speech input, or based on an alternative verbal formulation of the first speech input. It is also checked whether the user would like to input the new text or speech content, or whether the user performs a repetition of the speech content of the first speech input because he cannot find the desired recognition result in the output of the output device.

If it is recognized that this is a content input repetition, an excludable portion of the result list is thus determined. In other words, all the recognition results are determined with the first speech input, or a part of a recognition result is determined, which in connection with the speech recognition of the second speech input should not be presented one more time as a recognition result. By determining a recognition result with the second speech input, this excludable portion is accordingly excluded as a possible recognition results.

The advantage provided by the invention is that the user does not output one more time the excludable portion, so that it is thus very likely that a false recognition result will not be output a second time.

Different embodiments of the method according to the invention are possible depending on how the content input repetition described above is recognized.

According to one further development of the invention, the repetition of the content input is recognized in that the user performs an operating action predetermined for input correction. For example an input button or a signal word can be provided for this purpose.

In another embodiment, the content repetition is recognized in that in the second speech input an actual predetermined correction keyword is detected. For example, it is possible to check whether in the second speech input are contained the following words: "No, I meant . . . ".

According to another embodiment, the content input repetition is recognized in that the first speech input and the second speech input have a predetermined prosodic difference. In other words, the intonation is detected and classified. A per se known method can be employed for the detection and classification of prosody in speech. Typical classification can be provided as: calm, nervous, irritable. Since a certain predetermined prosodic difference is recognized between the first and the second speech input, for example in the change from calm to irritable, a conclusion can be drawn on that basis that this is an input repetition of the content.

In another embodiment, the content input repetition is recognized in that the first speech input and the second speech input correspond to each other based on a predetermined percentage match. In this case, the second speech input is also first converted by means of the speech recognition system and after that, a comparison of the recognition results to the first speech input and to the second speech input is made, for example on the level of words or on the level of characters.

Other developments of the method according to the invention relate to the manner and way in which the portion to be excluded when determining the recognition result is excluded with the second speech input.

In yet another development, a vocabulary or grammar of the speech recognition system is changed in order to exclude the excludable portion. It is thus possible for example to discard recognition hypotheses from the first recognition for the second recognition. In other words, the grammar of the speech recognition system is dynamically adapted. The advantage that is achieved in this manner is that the running time for the recognition process is shortened.

According to a further development, in order to exclude the excludable portion, at least a standard recognition result is detected for the second speech input first by means of the speech recognition system. By a standard recognition result is meant that unchanged grammar is used in comparison for recognition of the first speech input. After that, the portion to be filtered out from the standard recognition result is filtered out. In other words, for example all the recognition results that have been already used once are deleted from the list of the results. The advantage obtained in this manner is that the speech recognition system does not have to be manipulated, which is particularly advantageous with external speech recognition systems located outside of the vehicle.

The method according to the invention will be next described on embodiments relating to the determination of the excludable portion.

According to one embodiment, the excludable portion is determined as the portion of the result list that was successfully output from the output device to the user. This means that only what was in fact for example indicated to the user will be excluded.

A further development in this respect relates to outputting the result list through a graphical display device that has a smaller display area than the result list. With this embodiment, a scrolling operation of the output device is evaluated in order to determine the successfully output portion. This means that it is ascertained which portion of the result list was in fact displayed or indicated on the display area. The evaluation of the scrolling operation, for example evaluation of the coordinates of a scrolling signal, is a reliable indicator of a successful output.

On the other hand, according to another embodiment it is distinguished whether a recognition result of the result list was only output, or whether it was also perceived by the user when an eye movement of the user is detected by means of an eye tracking system, abbreviated as Eye Tracker (eye tracker). In order to determine the successfully output portion, only that portion of the result list is selected which that considered according to the detected eye movements of the user. For example, a viewing direction vector can be extrapolated and ascertained for this purpose where the extrapolated viewing direction occurs on the display area. Eye tracker technology that is suitable for this purpose is already available on the market.

According to another embodiment, in addition to the result list, the portion considered by the user is selected only if the user has considered this recognition result for a predetermined minimum period of time. This has the advantage that it is possible to make a distinction by using reading between the absence of skipping over the results on the one hand and a real consideration of the content. The speed during reading is also evaluated.

The invention also includes an operating device for a motor vehicle. This device is provided with a speech detection device for detection of a speech input by a user, which is to say for example a microphone or an array of multiple microphones. Furthermore, an output device for outputting a result list with the determined recognition result of at least one recognized speech input is also provided. The output device can be designed for verbal output via a synthetic voice and/or via a graphical output. It can be provided for example with a screen for a graphical output. The operating device according to the invention is characterized by a processor means, which is adapted to realize an embodiment of the method according to the invention.

Finally, the device also includes a motor vehicle that is equipped with an embodiment of the operating device according to the invention. The motor vehicle according to the invention is preferably an automobile, in particular a passenger car.

BRIEF DESCRIPTION OF THE DRAWINGS

An embodiment of the invention will be explained next. The single attached FIGURE shows a schematic representation of an embodiment of the motor vehicle according to the invention.

DETAILED DESCRIPTION OF THE DRAWINGS

The practical example explained below is a preferred embodiment of the invention. The components described in the exemplary embodiment, however, represent characteristics of the invention that are to be considered independently of each other, and which further develop the invention independently of each other, and thus should be considered individually, or in a different combination than the indicated one as structural parts of the invention. Furthermore, the described embodiment can be also complemented by other features than those already described here.

The FIGURE indicates schematically a motor vehicle 1, which can be an automobile, especially a passenger car. The motor vehicle 1 can be provided with an operating device 2 by means of which a user 3 of the motor vehicle 1 can operate one or several devices 4 of the motor vehicle. These devices can be for example one or several of the following ones: a media player, a telematics system, a navigation system, a telephone.

Voice control over the devices 4 can be performed through the operating device 2. For this purpose, the operating device 2 can be provided with a speech detection device 5, a speech recognition device 6, an output device 7, a control device 8, and a signal generating device 9. It is also possible to provide an embodiment in which an eye tracker 10 is provided, as it is per se known from prior art.

By means of an eye tracker 10, for example the view direction of the eyes of the user can be determined and/or monitored.

The user 3 can use a speech input 11 for voice operations. In the FIGURE is symbolically illustrated a speech input or a speech statement S1 as a speech input 11. In the example illustrated here, the user wants to try to use a navigation device to plan a route to Munich. The speech statement S1 can be for example: "Take me to Munich". The speech detection device can detect the sound of the speech in the speech input 11. For this purpose, the detection device 5 can be equipped for example with one or several microphones. The speech sound is converted by the speech detection device 5 into an electrical and/or digital voice signal and output to the speech recognition device 6 (ASR—Automatic Speech Recognition—automatic speech recognition).

The speech recognition device 6 can comprise a speech recognition system, or for example, it can be connected through a cellular phone connection (not shown) to a stationary speech recognition system, for example a speech recognition system on the internet. The speech input 11 can be decoded in a per se known manner with the speech recognition device 6, which is to say that the speech statement S1 is recognized as text. The speech recognition can be carried out for example on the basis of the hidden Markov Model (HMM).

With speech recognition, there can be one or several recognition results for a speech input 11. In the example it is assumed that the speech input 11 with speech statement S1 leads to several speech recognition results A, B, C, D. For example, the speech recognition results can differ in the recognized destination location, so that for example the speech recognition result A can be": Take me to Bonn!", the speech recognition results B can be: Take me to Berlin!", the speech recognition result C can be "Take me to Munich" and the speech recognition result D can be: "Take me to Salzburg!"

The speech recognition results A, B, C, D can be summarized by the speech recognition device 6 in a result list 12, which can be output to the output device 7. The output device 7 can output the recognition results A, B, C, D to the user 3, so that the user chooses the correct recognition result. For this purpose, the output device 7 outputs the result list 7 for example as a speech signal, which is to say as an acoustic output, or it can be provided with a display device 13, for example a screen. On the display area 14 of the display device 13 can be displayed a selection menu 15 with recognition results A, B, C, D of the result list 12. The display area 14 can be so small that the result list 12 cannot be fully displayed at a given point in time. In the example illustrated in the FIGURE, the FIGURE shows that it is the display result D that will not be shown. The user 3 can move the selection menu 15 for example by scrolling on the display area 14, so that other recognition results will be indicated on the display area 14.

The user can now select the result that he had in mind. To this end, the display device 13 can designed for example as a touch-sensitive device so that the user can for example tap on the correct recognition result in the selection menu 15. The selected recognition result can be passed on to the signal generating device 9. The signal generating device 9 generates a control signal depending on the selected recognition result in a manner that is per se known, which can be then issued to the appropriate device from the group of devices 4. In this example, a route plan is therefore initiated or triggered, or its parameters are set with a navigation means.

The motor vehicle 1 makes it possible for the user to carry out a recognition correction. If the user 3 cannot find the desired recognition result in the result list 12, he can generate or carry out another speech input 16. For example, the speech content or spoken statement S2 can be expressed as speech input 16 by the user 3. In this case, the user can simply repeat the speech statement S1, which is to say repeat one more time: "Take me to Munich". However, he can also make a different statement, for example: "No, take me to Munich."

The speech input 16 can be monitored in the manner described here with the speech detection device 5 and processed with the speech recognition device 6.

The speech recognition device 6 can be equipped with repetition detection 17, which can be designed to detect repetition of the content of the first speech input 11. For example, after decoding or recognition of the speech input 16 has been detected by the repetition detection 17, it is detected whether a signal word or keyword is contained in the speech input 16. In the present case, for example the word "no" can be interpreted as a correction request. If the user 3 repeats his input, which is to pronounce one more time the words "Take me to Munich!", then it can be detected by the repetition detection 17 for example based on the recognition result that multiple words, for example more than 60 percent or more than 70 percent, correspond to the recognition results of the first speech input 11. It can be for example also required that the user 3 should press a correction button while the speech input 16 is being uttered, which can then be detected by the repetition detection 17. It is also possible that that for example a prosody analysis of the speech intonation of the speech input 11 and 16 takes place and a comparison is carried out. If the user is impatient or angry, then this can be detected as a change of the prosody, which is to say of the character of the intonation. Prosody detection is known from prior art. The repetition detection 17 can be for example a program module of a processor device of the operating device 2.

The repetition detection 17 can then signal the detected correction request of the user 3 for example to the control device 8. The control device 8 can then be adapted to exclude with the speech recognition device 6 first those recognition results that the user 3 has already checked from the result list 18, so that the user 3 will not be confronted one more time with the false recognition results. The control device 8 can be for example a program module of a processor device.

The control device 8 can for example receive from the display device 7 a display list 9, which shows which part of the result list 12 has already been indicated on the display area 14. In addition or as an alternative, the control device 8 can receive from the eye tracker 10 for example view direction coordinates, which can be described through a view direction track 20, so that it can be detected on this basis which menu items of the menu 15 the user 3 has in fact looked at and/or for how long which menu item of the menu 15 has been viewed. Corresponding view direction data 21 can be provided by the eye tracker 10 to the control device 8.

In the example it is assumed that the control device 8 receives the view direction data 21 from the eye tracker 10, while the speech recognition device 6 configures an excludable portion 22 obtained from the speech recognition results A, B, C, D of the first speech input 11 for the recognition of the speech content S2 to be excluded. For example the words Bonn and Berlin (A, B) can be excluded. In particular, instead of the entire speech recognition result, only a single word from it can be determined to be the excludable portion 22. The speech recognition device 6 can then exclude or filter out from the recognition the results that were determined to be excluded for the speech input 16 the portion 22.

Accordingly, a result list 18 created with the speech recognition device 6 in the illustrated example is generated, which can contain the speech recognition results C, D, E for the speech content S2. The excludable portions, in this case A, B, are thus excluded. The result list 18 can thus in addition to the recognition results C, D still also contain for example the recognition result E: "Take me to Paris".

It is not further illustrated by the FIGURE that the result list 18 can now be indicated or generated for example on the display area 14 for the user 3 by the output device 7. The user 3 can choose the correct recognition result, whereupon it can be output in the described manner by the signal generating device 9 and the devices 4 can be thus controlled.

A correction on the side of the user is therefore determined with the operating device 2 so that already recognized results of the preceding input can be discarded and so that they will not be presented again to the user. The advantage obtained here is that the recognition of the second input can be improved because it is not necessary to take into account the recognition results from the first input. In addition, falsely identified results will not be presented to the user. The system thus appears to the user to be more intelligent. This is realized so that a correction is determined on the side of the user, which means the recognition results from the first input will not be used for recognition in the second step. The recognition hypotheses from the first recognition will therefore be discarded for the second recognition.

Overall, the example shows how the invention can provide a correction strategy for speech input with items that are input by voice.

The invention claimed is:

1. A method for operating a motor vehicle operating device, comprising:
   receiving, by a speech detection device, a first speech input of a user,
   determining, by a speech recognition device, at least one recognition result for the first speech input, so that at least one recognition result is output at an output device of the motor vehicle as result list, and
   receiving, by the speech detection device, a second speech input of the user, wherein a content input repetition of the first speech input is recognized, by a repetition detection device, in the second speech input,
   determining, by a control device, an excludable portion of the result list; and with the determination of the recognition result for the second speech input, the excludable portion is excluded as possible recognition result,
   generating, by a signal generating device, a control signal using the recognition result, and
   transmitting, by the signal generating device, the control signal to at least one device of the motor vehicle to control the at least one device of the motor vehicle,
   wherein at least one of the speech recognition device, the repetition detection device and the output device communicate with the control device so that the control device determines the excludable portion.

2. The method according to claim 1, wherein repetition of the input content is recognized on the basis of at least one of the following criteria:
   the user performs a predetermined operation provided for an input correction;
   a predetermined correction keyword is recognized in the second speech input;
   a predetermined prosodic difference is displayed between the first speech input and the second speech input;
   the first speech input and the second speech input agree with each other to a predetermined minimum extent.

3. The method according to claim 1, wherein in order to exclude the excludable portion, the grammar of the speech recognition system is changed.

4. The method according to claim 1, wherein in order to exclude the excludable portion by means of the speech recognition system, at least one standard recognition result is determined for the second speech input and the excludable portion is filtered out from the standard recognition result.

5. The method according to claim 1, wherein as the excludable portion is selected the portion of the result list that was successfully output by the output device to the user is determined.

6. The method according to claim 5, wherein in order to determine the portion that was successfully output, a scrolling operation of the output device is evaluated.

7. The method according to claim 5, wherein an eye movement of the user is detected by means of an eye tracker and to determine the successfully output portion from the result list, and only the successfully output portion is selected from that viewed by the user according to the detected eye movement.

8. The method according to claim 7, wherein the successfully output portion is determined from the result list if the user has viewed this portion for a predetermined minimum period of time.

* * * * *